(12) United States Patent
Arai

(10) Patent No.: US 8,760,813 B2
(45) Date of Patent: Jun. 24, 2014

(54) CONDUCTING MEMBER OF DISK DRIVE SUSPENSION AND DISK DRIVE SUSPENSION

(71) Applicant: NHK Spring Co., Ltd., Yokohama (JP)

(72) Inventor: Mikio Arai, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/857,706

(22) Filed: Apr. 5, 2013

(65) Prior Publication Data

US 2013/0314821 A1    Nov. 28, 2013

(30) Foreign Application Priority Data

May 23, 2012 (JP) .................................. 2012-117700

(51) Int. Cl.
*G11B 5/48* (2006.01)
(52) U.S. Cl.
USPC ........................................................ 360/244.5
(58) Field of Classification Search
USPC ........................................................ 360/244.5
See application file for complete search history.

(56) References Cited

U.S. PATENT DOCUMENTS

| 6,731,472 B2 | 5/2004 | Okamoto et al. | |
|---|---|---|---|
| 8,339,743 B2 * | 12/2012 | Miura et al. | 360/244.3 |
| 8,390,958 B2 * | 3/2013 | Ohnuki et al. | 360/245.9 |
| 8,508,889 B2 * | 8/2013 | Kin | 360/264.2 |
| 8,582,245 B2 * | 11/2013 | Hanya et al. | 360/245.9 |
| 2009/0190263 A1 * | 7/2009 | Miura et al. | 360/245.8 |
| 2011/0279929 A1 | 11/2011 | Kin | |
| 2012/0134056 A1 * | 5/2012 | Yamada | 360/245.9 |

FOREIGN PATENT DOCUMENTS

| JP | 2001-307442 A | 11/2001 |
|---|---|---|
| JP | 2011-238860 A | 11/2001 |
| JP | 2002-50140 A | 2/2002 |
| JP | 2002-050140 A | 2/2002 |
| JP | 2011-238860 A | 11/2011 |

* cited by examiner

*Primary Examiner* — Mark Blouin
(74) *Attorney, Agent, or Firm* — Holtz Holtz Goodman & Chick PC

(57) ABSTRACT

A terminal area includes a metal plate, an electrically insulating layer, and a conductor layer. An opening section is formed in the metal plate and the insulating layer. A gold plating layer is formed on a surface of the conductor layer inside the opening section. A porous metal layer of a first transition element is formed on a surface of the gold plating layer. Through-holes of the porous metal layer reach the surface of the gold plating layer. An electrically conductive adhesive is provided between an electrode of an actuator element and the porous metal layer. An anchor portion of the electrically conductive adhesive gets into the through-holes and is cured. Conductive particles of the electrically conductive adhesive contact the gold plating layer.

6 Claims, 6 Drawing Sheets

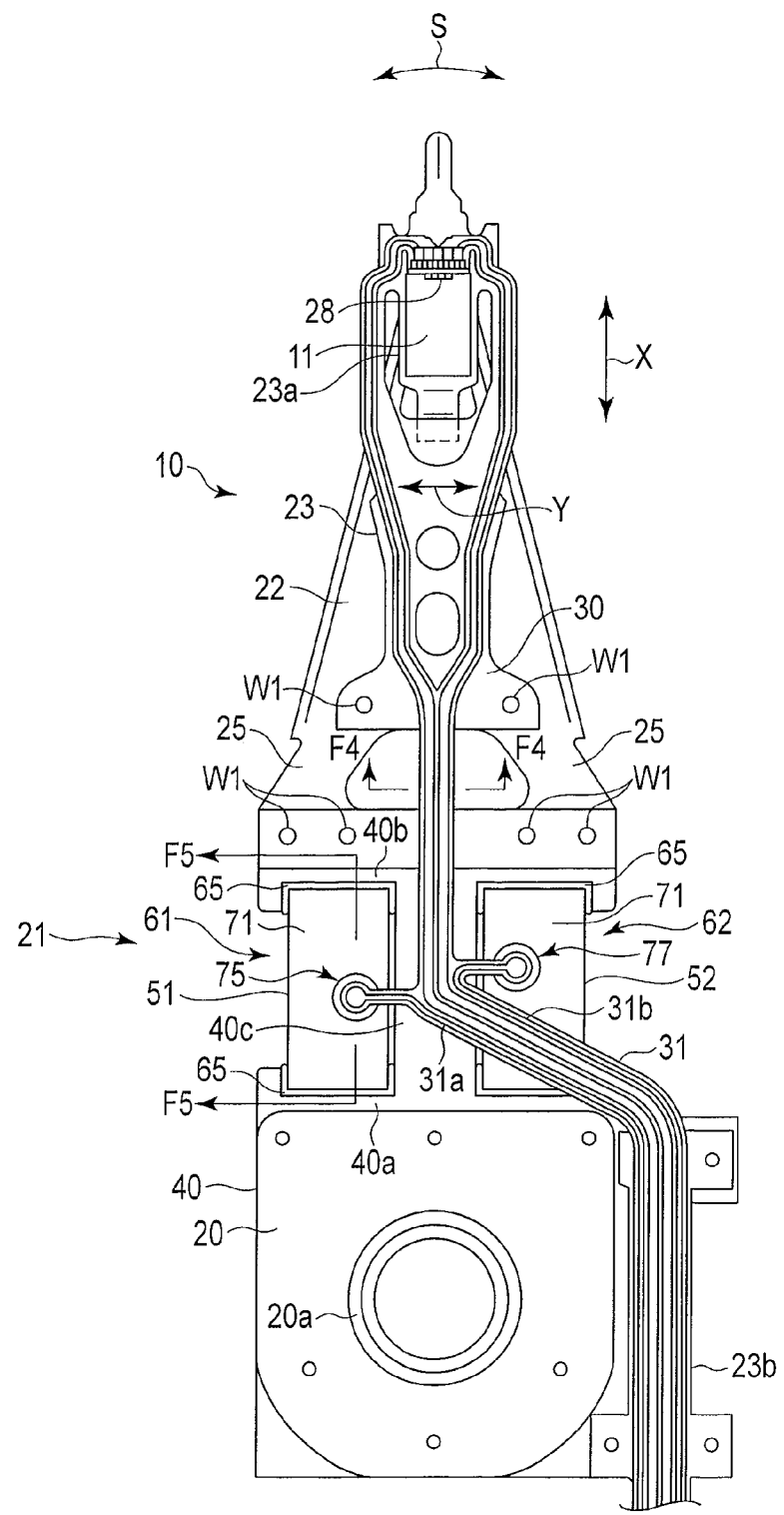
F I G. 3

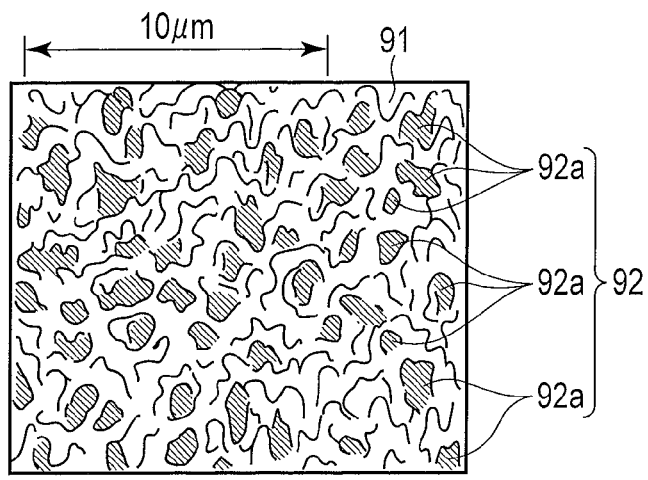
F I G. 9
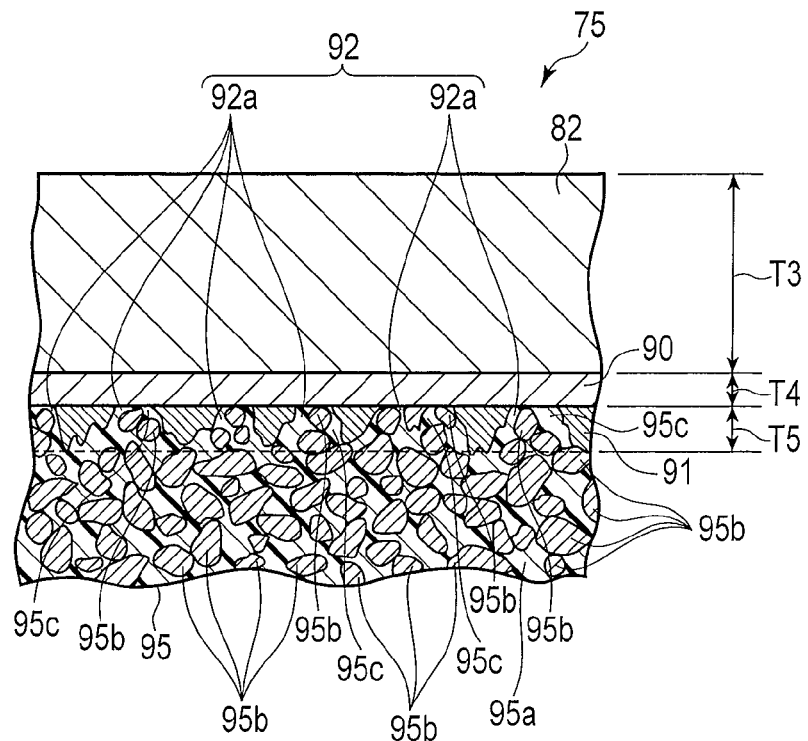
F I G. 10

CONDUCTING MEMBER OF DISK DRIVE SUSPENSION AND DISK DRIVE SUSPENSION

CROSS-REFERENCE TO RELATED APPLICATIONS

This application is based upon and claims the benefit of priority from prior Japanese Patent Application No. 2012-117700, filed May 23, 2012, the entire contents of which are incorporated herein by reference.

BACKGROUND OF THE INVENTION

1. Field of the Invention

This invention relates to a conducting member of a disk drive suspension comprising an electronic component, such as an actuator element, and the disk drive suspension.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam and flexure super posed thereon. A slider, which constitutes a magnetic head, is mounted on a gimbal portion formed near the distal end of the flexure. The slider is provided with elements (transducers) for accessing data, that is, for reading or writing.

In order to overcome the increase in the recording density of disks, the magnetic head should be more precisely positioned relative to the recording surface of each disk. To attain this, dual-stage actuator (DSA) suspensions, such as those disclosed in Jpn. Pat. Appln. KOKAI Publications Nos. 2001-307442 (Patent Document 1) and 2002-50140 (Patent Document 2), have been developed. One such DSA suspension combines a positioning motor (voice coil motor) and actuator element made of a piezoelectric material, such as lead zirconate titanate (PZT).

The distal end of the suspension can be moved by an infinitesimal distance in a sway direction (or transversely relative to tracks) by applying a voltage to and thereby deforming the actuator element. This actuator element is disposed on an actuator mounting section of the suspension.

The piezoelectric material is in the form of a plate, and one electrode is provided on one thicknesswise surface thereof, and the other electrode on the other surface. The one electrode is electrically connected to metallic plate member with an electrically conductive adhesive, such as silver paste. The other electrode is connected to a conducting member of the flexure by an electrically conductive member, such as a bonding wire. In some cases, as disclosed in Jpn. Pat. Appln. KOKAI Publication No. 2011-238860 (Patent Document 3), a terminal area of a conducting member may be connected to an electrode of an actuator element with an electrically conductive adhesive.

In the terminal area, a gold plating layer is conventionally formed on the surface of a metal, such as copper or stainless steel, to enhance electrical conduction with the electrically conductive adhesive. Since gold is an inert metal, however, its adhesion to the electrically conductive adhesive is poor. In some cases, therefore, the peel strength between the electrically conductive adhesive and terminal area may be reduced in gold-plated regions. When a continuity test was conducted in a hot, humid atmosphere, for example, the electrical resistance between the terminal area and electrically conductive adhesive increased, thereby causing failure in electrical conduction to the actuator element. To enhance the adhesion between the terminal area and electrically conductive adhesive, an attempt may be made to increase the pressing force of a bonding tool so that the terminal area can be pressed against the electrode of the actuator element with a heavier load. If the pressing force increases, however, a piezoelectric material, such as PZT, may possibly be broken.

As disclosed in Patent Document 3, moreover, a proposal has been made to apply laser light to a gold plating layer, thereby forming a large number of irregularities on the surface of the plating layer. Since the gold plating is made of an inert metal, however, formation of the irregularities as a measure to enhance the adhesion to the electrically conductive adhesive leaves room for improvement.

BRIEF SUMMARY OF THE INVENTION

Accordingly, the object of this invention is to provide a conducting member and a disk drive suspension, capable of reliably achieving fixation and electrical conduction between an electrode of an electronic component, such as an actuator element, and a terminal area.

One embodiment of a conducting member with a terminal area comprises a metal plate, an electrically insulating layer formed on the metal plate, an opening section formed in the metal plate and the insulating layer, a conductor layer formed on the insulating layer and covering the opening section, a gold plating layer formed on a surface of the conductor layer inside the opening section, and a porous metal layer formed on a surface of the gold plating layer inside the opening section. The porous metal layer is made of a first transition element, such as nickel or chromium, and comprises a through-hole group comprising a large number of through-holes which reach the surface of the gold plating layer. In the embodiment of the conducting member, an electrically conductive adhesive is provided between the porous metal layer and an electrode. This electrically conductive adhesive comprises a resin base material, conductive particles, and an anchor portion cured in the through-hole group. The conductive particles in the electrically conductive adhesive contact the gold plating layer.

In the disk drive suspension with an electronic component, such as an actuator element, according to this arrangement, the electrode of the electronic component and the terminal area can be reliably secured to each other by the electrically conductive adhesive, and good electrical conduction between the electrode and the terminal area can be achieved.

A disk drive suspension of one embodiment comprises a base section secured to an arm of a carriage of a disk drive, a load beam on which a magnetic head is disposed, an actuator element, and the conducting member connected to an electrode of the actuator element. The actuator element is made of a piezoelectric material, such as PZT, and is disposed in an actuator mounting section between the base section and the load beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general, description given above and the detailed description of the embodiments given below, serve to explain the principles of the invention.

FIG. 3 is a plan view of a disk drive suspension according to a first embodiment;

FIG. 9 is a partially enlarged view of a porous metal layer of the terminal area shown in FIG. 6;

FIG. 10 is a partially enlarged sectional view of the terminal area and an electrically conductive adhesive.

DETAILED DESCRIPTION OF THE INVENTION

A disk drive suspension with a conducting member according to a first embodiment will now be described with reference to FIGS. 1 to 10.

Figure 1:
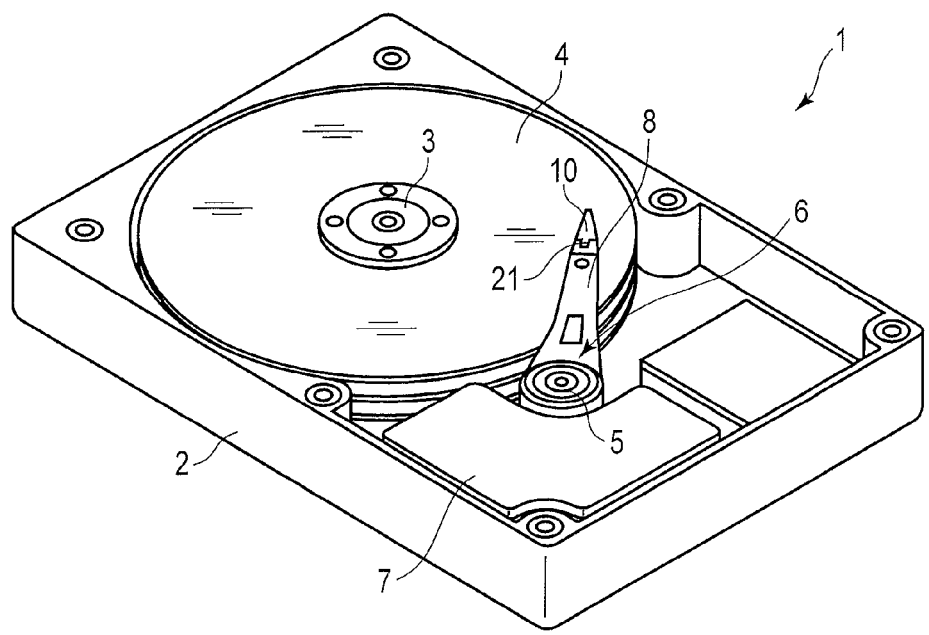
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
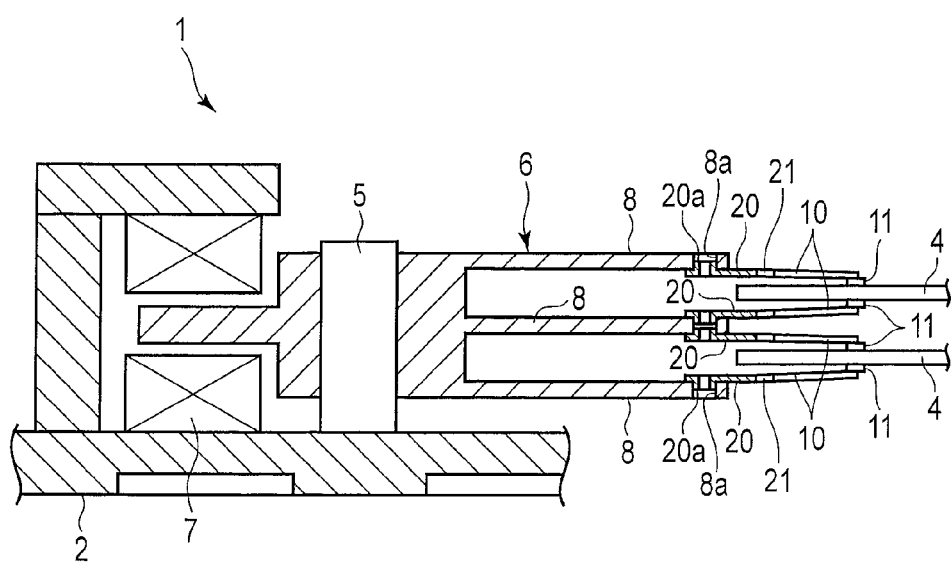
FIG. 2 is a sectional view of a part of the disk drive shown in FIG. 1.

FIG. 2 a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. If each disk 4 rotates at high speed, an air bearing is formed between the disk 4 and the slider 11. If the carriage 6 is turned by the positioning motor 7, the suspension 10 moves radially relative to the disk 4, whereupon the slider 11 moves to a desired track of the disk 4.

FIG. 3 shows the suspension 10 of the dual-stage actuator (DSA) type. This suspension 10 comprises a base section 20, actuator mounting section 21, load beam 22, flexure 23 with conductors, etc. The base section 20 is secured to its corresponding arm 8 (FIGS. 1 and 2) of the carriage 6. A boss portion 20a to be inserted into a hole 8a (FIG. 2) in each arm 6 is formed on the base section 20.

In FIG. 3, arrow X indicates the longitudinal direction of the load beam 22, that is, the longitudinal direction (front-rear direction) of the suspension 10; arrow Y, the transverse direction; and arrow S, a sway direction. Hinge portions 25 capable of thicknesswise elastic deformation are formed on the proximal portion (rear end portion) of the load beam 22. The actuator mounting section 21 is provided between the base section 20 and load beam 22. The mounting section 21 has the function of moving the load beam 22 in the sway direction (indicated by arrow S).

The flexure 23 is disposed along the load beam 22. A tongue 23a (FIG. 3) that functions as a gimbal portion is formed near the distal end of the load beam 22, that is, near that of the flexure 23. The slider 11, which serves as the magnetic head, is mounted on the tongue 23a. Elements 28, such as magnetoresistive elements, capable of conversion between magnetic and electrical signals are arranged on an end portion of the slider 11. These elements 28 are used for accessing data on the disks 4, that is, for writing or reading. The slider 11, load beam 22, flexure 23, etc., constitute a head gimbal assembly. A rear portion 23b of the flexure 23 extends rearward from the base section 20.

Figure 4:
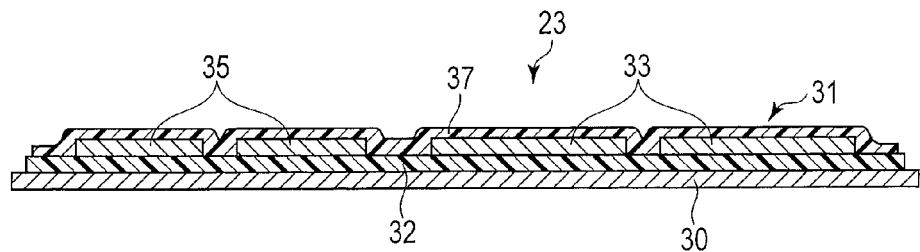
FIG. 4 is a sectional view of a flexure with conductors taken along line F4-F4 of FIG. 3.

FIG. 4 shows an example of a transverse cross-section of the flexure 23. The flexure 23 comprises a metal plate 30 of, for example, stainless steel and a conducting member 31 formed thereon. The conducting member 31 comprises an insulating layer 32, write conductors 33, read conductors 35, cover layer 37, etc. The insulating layer 32 is made of an electrically insulating material, such as polyimide. The write and read conductors 33 and 35 are connected to the elements 28 on the slider 11. These conductors 33 and 35 are formed on the insulating layer 32. The cover layer a is made of an electrically insulating material, such as polyimide. The metal plate 30 of the flexure 23 is secured to the load beam 22 by welds W1 (some of which are shown in FIG. 3), such as laser spot welds.

Figure 5:
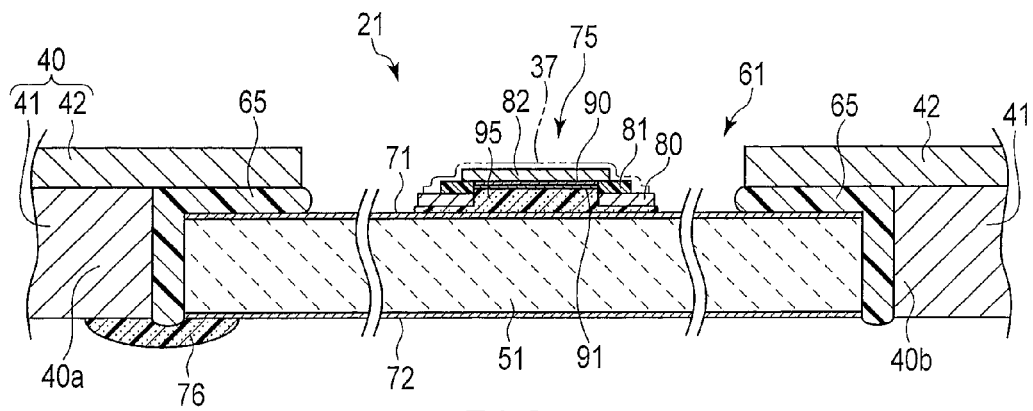
FIG. 5 is a sectional view of an actuator mounting section taken along line F5-F5 of FIG. 3.

FIG. 5 is a sectional view of the actuator mounting section 21. The actuator mounting section 21 comprises a plate member 40 and a pair of actuator elements 51 and 52 (FIG. 3). The plate member 40 is formed by superposing first and second plates 41 and 42 thicknesswise. The actuator elements 51 and 52 are made of a piezoelectric material, such as PZT. A part (rear part) of the plate member 40 forms the base section 20. The actuator elements 51 and 52 are examples of electronic components.

The plate member 40 comprises a stationary part 40a adjoining the base section 20, movable part 40b adjoining the hinge portions 25, and bridge portion 40c. The bridge portion 40c connects the stationary part 40a and movable part 40b. The stationary part 40a is a part that is substantially immovable relative to the base section 20. The movable part 40b is a part that can be moved in the sway direction by the actuator elements 51 and 52.

The plate member 40 is formed with openings 61 and 62 capable of accommodating the actuator elements 51 and 52, respectively. The actuator elements 51 and 52 are accommodated in the openings 61 and 62, respectively. The actuator elements 51 and 52 are secured to the plate member 40 by electrically insulating adhesives 65.

FIG. 5 representatively shows the one actuator element 51. A first electrode 71 is provided on one thicknesswise surface of the actuator element 51, and a second electrode 72 on the other surface of the actuator element 51. These electrodes 71 and 72 are formed on the surface of the PZT by sputtering or plating. The other actuator element 52 is constructed in the same manner as the actuator element 51.

The first electrode 71 of the actuator element 51 is electrically connected to a conductor 31a (FIG. 3) of the conducting member 31 through a terminal area 75. The first electrode 71 of the actuator element 52 is electrically connected to a conductor 31b of the conducting member 31 through a terminal area 77. The respective second electrodes 72 (FIG. 5) of the actuator elements 51 and 52 are individually connected to the plate member 40 through an electrically conductive member 76, such as silver paste. Since these terminal areas 75 and 77 are constructed in the same manner, the one terminal area 75 will be representatively described below.

Figure 6:
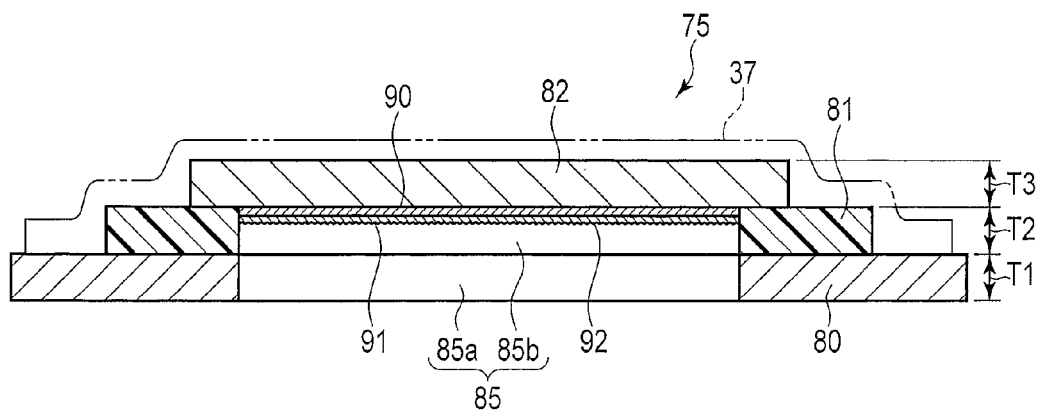
FIG. 6 is en enlarged sectional view of a terminal area of the actuator mounting section shown in FIG. 5.
Figure 7:
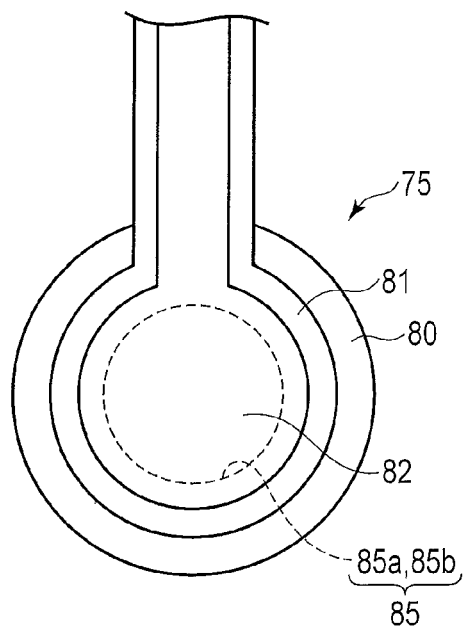
FIG. 7 is a plan view of the terminal area shown in FIG. 6.
Figure 8:
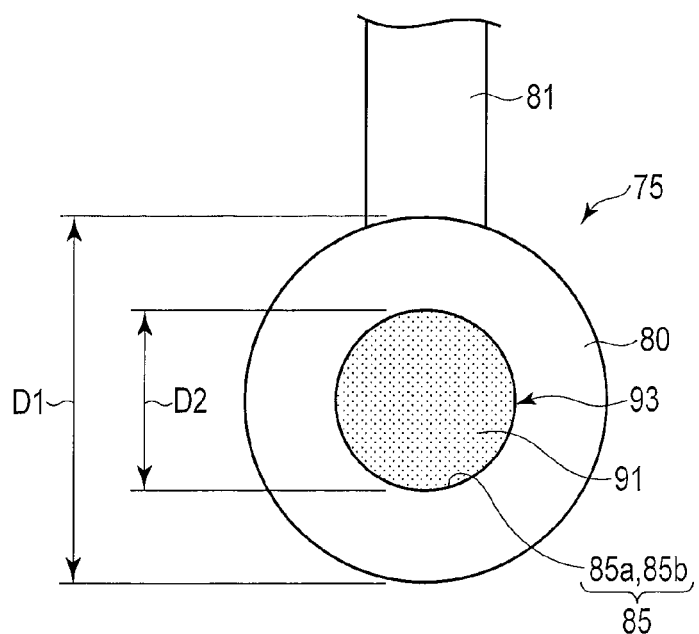
FIG. 8 is a bottom view of the terminal area shown in FIG. 6.

FIG. 6 is an enlarged sectional view of terminal, area 75. FIGS. 7 and 8 are plan and bottom views, respectively, of the terminal area 75. The terminal area 75 comprises a metal plate 80, electrically insulating layer 81, and conductor layer 82.

The insulating layer 81 is formed on the metal plate 80, and the conductor layer 82 on the insulating layer 81. The metal plate 80 is made of a stainless steel material shared by the metal plate 30 of the flexure 23. The metal plate 80 has an annular contour formed by etching. The insulating layer 81 is made of an electrically insulating resin, such as polyimide, shared by the insulating layer 32 of the flexure 23.

The conductor layer 82 is made of copper shared by the conductors 31*a*, 31*b*, 33 and 35 of the flexure 23.

The conductor layer 82 has a contour formed by, for example, etching. Thickness T1 (FIG. 6) of the metal plate 80 is adjusted to 12 to 25 μm (for example, 18 μm). Thickness T2 of the insulating layer 81 is adjusted to 5 to 20 μm (for example, 10 μm), and thickness T3 of the conductor layer 82 to 4 to 15 μm (for example, 10 μm). The conductor layer 82 is covered by the cover layer 37 (indicated by a two-dot chain line in FIGS. 5 and 6). The cover layer 37 is not shown in FIG. 3.

As shown in FIGS. 7 and 8, circular openings 85*a* and 85*b* are formed in the metal plate 80 and insulating layer 81, respectively. The opening 85*b* is formed corresponding in position to the opening 85*a* in the metal plate 80. The openings 85*a* and 85*b* constitute an opening section 85. The conductor layer 82 is circular and covers the opening section 85. Outer and inner diameters D1 and D2 (FIG. 8) are 0.4 and 0.2 mm, respectively. However, they may be alternative dimensions. Although the metal plate 80, insulating layer 81, conductor layer 82, and opening section 85 of the present embodiment are concentric with one another, they need not always be so.

Inside the opening section 85 of the terminal area 75, a gold plating layer 90 is formed on the surface of the conductor layer 82. The gold plating layer 90 is formed only inside the opening section 85 on the surface of the conductor layer 82. Thus, the consumption of gold can be reduced compared with the case where a gold plating layer is formed on the entire surface of the conductor layer 82.

Inside the opening section 83, moreover, a porous metal layer 91 is formed on the surface of the gold plating layer 90. The porous metal layer 91 is made of a first transition element (for example, nickel). FIG. 9 is an enlarged view of a part of the porous metal layer 91 based on an electron photomicrograph of 4,000 times magnification. An example of the porous metal layer 91 is formed by etching a nickel plating layer formed on the surface of the gold plating layer 90. The porous metal layer 91 comprises a through-hole group 92 comprising a large number of through-holes 92*a*. The through-holes 92*a* are indicated by hatched regions, individually, in FIG. 9. The porous metal layer 91 comprising these through-holes 92*a* form, so to speak, a texture structure. The porous metal layer 91 may be made of a first transition element other than nickel, such as chromium, titanium, vanadium, or zinc.

FIG. 10 is a partially enlarged sectional view of the terminal area 75 comprising the porous metal layer 91. Thicknesses T4 and T5 of the gold plating layer 90 and porous metal layer 91 are both adjusted to 0.1 to 5 μm (for example 1 μm). As shown in FIG. 10, the through-holes 92*a* constituting the through-hole group 92 individually reach the surface of the gold plating layer 90. In other words, a part of the surface of the gold plating layer 90 is exposed to a space inside the opening section 85 through the through-holes 92*a* before an electrically conductive adhesive 95 (described below) is provided.

The following is a description of a method of manufacturing the terminal area 75 comprising the porous metal layer 91 constructed in this manner. The insulating layer 81 is first formed on the metal plate 80, and the conductor layer 82 is then formed on the insulating layer 81. Further, the openings 85*a* and 85*b* in the metal plate 80 and insulating layer 81 are formed by etching or the like. Then, the gold plating layer 90 is formed on the surface of the conductor layer 82 inside the opening section 85 by gilding. The nickel plating layer as the base of the porous metal, layer 91 is formed by further plating the surface of the gold plating layer 90 with nickel. This nickel plating layer is subjected to an electrolytic treatment in an etchant, such as a phosphate solution. The porous metal layer 91 comprising the porous through-hole group 92 including the large number of through-holes 92*a* is formed by this electrolytic treatment. The size of the through-holes 92*a* can be adjusted according to the composition of the etchant and etching rate.

As shown in FIG. 5, the electrically conductive adhesive 95 is provided between the electrode 71 of the actuator element 51 and the gold plating layer 90 of the terminal area 75. The electrically conductive adhesive 95 is filled into the opening section 85 of the terminal area 75 and cured. The terminal area 75 is secured to the electrode 71 of the actuator element 51 by the electrically conductive adhesive 95. The electrically conductive adhesive 95 enables the conductor layer 82 of the terminal area 75 to be electrically conducted to the electrode 71 of the actuator element 51.

An example of the electrically conductive adhesive 95 is silver paste. The silver paste comprises a resin base material 95*a* (FIG. 10), which serves as an organic binder, and a large number of electrically conductive particles (silver particles) 95*b* mixed in the resin base material 95*a*. The uncured electrically conductive adhesive 95 is applied between the electrode 71 of the actuator element 51 and the gold plating layer 90 inside the opening section 85 of the terminal area 75. Thereafter, the electrically conductive adhesive 95 is fired at a low temperature of, for example, 150° C. or less, whereupon the conductive particles (silver particles) 95*b* contact one another and the resin base material 95*a* is cured. Thus, the elect rode 71 and terminal area 75 are secured to each other, and the conductor layer 82 and electrode 71 are electrically conducted to each other.

As shown in FIG. 10, an anchor portion 95*c* is formed as some of the electrically conductive adhesive 95 gets into the through-holes 92*a* of the porous metal layer 91 and is cured. Some of the large number of electrically conductive particles 95*b* in the cured anchor portion 95*c* electrically contact the gold plating layer 90. Thus, in the terminal area 75 of the present embodiment, the conductive particles 95*b* of the electrically conductive adhesive 95 cured in the through-holes 92*a* of the porous octal layer 91 contact the gold plating layer 90. The porous metal layer 91, which is made of a first transition element, such as nickel or chromium, can be firmly secured to the gold plating layer 90 by means of primary bonding strength, such as hydrogen bonding strength.

In addition, on anchor effect can be obtained as some of the electrically conductive adhesive 95 gets into the through-holes 92*a* of the porous metal layer 91 and is cured. This anchor effect gives mechanical secondary bonding strength to the porous metal layer 91 and electrically conductive adhesive 95. Accordingly, the electrically conductive adhesive 95 can be firmly secured to the terminal area 75. As the conductive particles 95*b* contact the gold plating layer 90, moreover, a good electrical connection can be achieved between the conductor layer 82 and electrically conductive adhesive 95. The terminal area 77 that is connected to the other actuator element 52 is constructed in the same manner as the terminal area 75.

Thus, in the present embodiment, a nickel or chromium plating layer is deliberately formed on the surface of the gold plating layer 90. In addition, the porous metal layer 91 of nickel or chromium is formed by etching the nickel or chromium plating layer. Based on this novel multi-lever porous structure, a high anchor effect can be achieved for the electrically conductive adhesive 95.

The electrical resistances of nickel and chromium are more than several time as high as that of silver. Since the conductive particles 95b get into the through-hole group 92 of the porous metal layer 91 and contact the gold plating layer 90, an increase in the electrical resistance can be suppressed. Since the conductive particles 95b contact the porous metal layer 91 in the vicinity of the gold plating layer 90, moreover, an increase in the electrical resistance can be suppressed. While the through-hole group 92 of the porous metal layer 91 is being formed by etching, some of gold in the gold plating layer 90 can transfer to the through-hole group 92 by diffusion, depending on the conditions. Electrical contact with the conductive particles (silver particles) 95b can be improved in this case.

The following is a description of the operation of the suspension 10.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to the actuator elements 51 and 52, the actuator elements are distorted in opposite directions according to the voltage level. Accordingly, the load beam 22 can be finely moved in the sway direction (indicated by arrow S in FIG. 3). As the actuator elements 51 and 52 extend and contract, respectively, for example, the load team 22 moves in the sway direction. Thus, the slider 11 can be positioned quickly and accurately in the sway direct ion.

Figure 11:
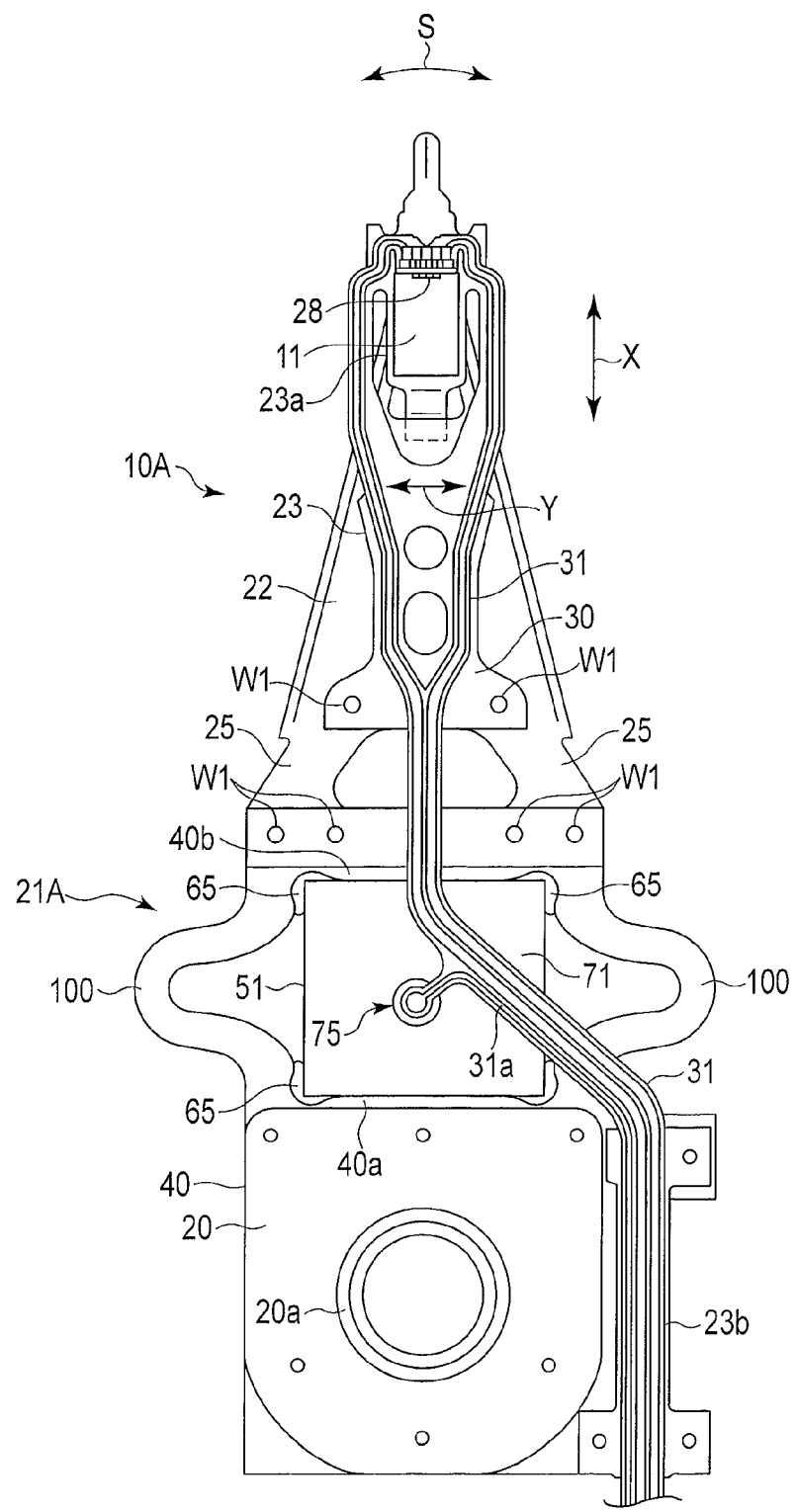
FIG. 11 is a plan view of a disk drive suspension according to a second embodiment.

FIG. 11 shows a suspension 10A according to a second embodiment. An actuator mounting section 21A of this suspension 10A comprises a single actuator element 51. A pair of U-shaped arm portions 100 are formed individually on opposite side portions of a plate member 40. A conductor 31a on a conducting member 31 of a flexure 23 is connected to an electrode 71 of the actuator element 51 through a terminal area 75. Since this terminal area 75 is constructed in the same manner as that of the actuator mounting section 21 of the first embodiment (FIGS. 5 to 10), a description thereof is omitted.

If a voltage is applied to the actuator element 51 so that the actuator element is distorted, in the actuator mounting section 21A of this embodiment, one of the arm portions 100 contracts, and the other extends. Thereupon, a load beam 22 can be moved in a sway direction. (indicated by arrow S in FIG. 11). Since other configurations and effects are common to the actuator mounting sections 21 and 21A of the first and second embodiments, common numbers are used to designate common portions of the first and second embodiments, and a description of those portions is omitted.

It is to be understood, in carrying out the present invention, that the specific forms of the constituent elements of the terminal area of the conducting member, including the metal plate, electrically insulating layer, conductor layer, gold plating layer, electrically conductive adhesive, porous metal layer, etc., as well as of the suspension mounted with the electronic components, may be modified variously. Further, the present invention may be applied to a terminal area that is connected to an electrode of an electronic component other than an actuator element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A conducting member of a disk drive suspension with a terminal area connected to an electrode, the terminal area comprising:
a metal plate;
an electrically insulating layer formed on the metal plate;
an opening section formed in the metal plate and the insulating layer;
a conductor layer formed on the insulating layer and covering the opening section;
a gold plating layer formed on a surface of the conductor layer inside the opening section;
a porous metal layer of a first transition element formed on a surface of the gold plating layer inside the opening section and comprising a through-hole group which reaches the surface of the gold plating layer; and
an electrically conductive adhesive provided between the porous metal layer and the electrode, comprising a resin base material, conductive particles, and an anchor portion cured in the through-hole group, the conductive particles contacting the gold plating layer.

2. The conducting member of a disk drive suspension of claim 1, wherein the porous metal layer is made of metal selected from the group consisting of nickel and chromium.

3. A conducting member of a disk drive suspension with a terminal area connected to an electrode, the terminal area comprising:
a metal plate;
an electrically insulating layer formed on the metal plate;
an opening section formed in the metal plate and the insulating layer;
a conductor layer formed on the insulating layer and covering the opening section;
a gold plating layer formed on a surface of the conductor layer inside the opening section; and
a porous metal layer of a first transition element formed on a surface of the gold plating layer inside the opening section and comprising a through-hole group which reaches the surface of the gold plating layer.

4. The conducting member of a disk drive suspension of claim 3, wherein the porous metal layer is made of metal selected from the group consisting of nickel and chromium.

5. A disk drive suspension comprising:
a base section secured to an arm of a carriage of a disk drive;
a load beam on which a magnetic head is disposed;
an actuator element disposed in an actuator mounting section between the base section and the load beam; and
a conducting member comprising a terminal area connected to an electrode of the actuator element,
the terminal area comprising:
a metal plate;
an electrically insulating layer formed on the metal plate;
an opening section formed in the metal plate and the insulating layer;
a conductor layer formed on the insulating layer and covering the opening section;
a gold plating layer formed on a surface of the conductor layer inside the opening section;
a porous metal layer of a first transition element formed on a surface of the gold plating layer inside the opening section and comprising a through-hole group which reaches the surface of the gold plating layer; and an electrically conductive adhesive provided between the porous metal layer and the electrode, comprising a resin base material, conductive particles, and an anchor portion cured in the through-hole group, the conductive particles contacting the gold plating layer.

6. The disk drive suspension of claim 5, wherein the porous metal layer is made of nickel.

* * * * *